US008527592B2

(12) United States Patent
Gabe

(10) Patent No.: US 8,527,592 B2
(45) Date of Patent: Sep. 3, 2013

(54) REPUTATION-BASED METHOD AND SYSTEM FOR DETERMINING A LIKELIHOOD THAT A MESSAGE IS UNDESIRED

(75) Inventor: Christopher John Gabe, Mississauga (CA)

(73) Assignee: WatchGuard Technologies, Inc., Seattle, WA (US)

( * ) Notice: Subject to any disclaimer, the term of this patent is extended or adjusted under 35 U.S.C. 154(b) by 807 days.

(21) Appl. No.: 11/554,746

(22) Filed: Oct. 31, 2006

(65) Prior Publication Data
US 2008/0104180 A1     May 1, 2008

(51) Int. Cl.
*G06F 15/00* (2006.01)
*H04L 29/06* (2006.01)

(52) U.S. Cl.
USPC .......................................... 709/206; 709/217

(58) Field of Classification Search
USPC ........................................................ 709/206
See application file for complete search history.

(56) References Cited

U.S. PATENT DOCUMENTS

| 4,837,798 A * | 6/1989 | Cohen et al. ............... 379/88.14 |
| 5,619,648 A * | 4/1997 | Canale et al. .................. 709/206 |
| 5,627,764 A * | 5/1997 | Schutzman et al. .......... 709/207 |
| 5,634,005 A * | 5/1997 | Matsuo ......................... 709/206 |
| 5,742,668 A * | 4/1998 | Pepe et al. .................... 455/415 |
| 5,771,355 A * | 6/1998 | Kuzma .......................... 709/232 |
| 5,796,948 A * | 8/1998 | Cohen ........................... 709/206 |
| 5,832,208 A * | 11/1998 | Chen et al. ...................... 726/24 |
| 5,844,969 A * | 12/1998 | Goldman et al. ........... 379/93.24 |
| 5,889,943 A * | 3/1999 | Ji et al. ............................. 726/22 |
| 5,937,161 A * | 8/1999 | Mulligan et al. .............. 709/206 |
| 5,937,162 A * | 8/1999 | Funk et al. ..................... 709/206 |
| 5,968,117 A * | 10/1999 | Schuetze ....................... 709/206 |
| 5,999,932 A * | 12/1999 | Paul ................................ 707/10 |
| 6,014,429 A * | 1/2000 | LaPorta et al. ............. 379/88.15 |
| 6,023,723 A * | 2/2000 | McCormick et al. ......... 709/206 |

(Continued)

FOREIGN PATENT DOCUMENTS

| JP | 2005149072 A | * | 6/2005 |
| WO | WO 9933188 A2 | * | 7/1999 |

OTHER PUBLICATIONS

Croft, N.J., et al., "A Model for Spam Prevention in IP Telephony Networks using Anonymous Verifying Authorities," Information and Computer Security Architectures Research Group, Department of Computer Science, Apr. 2005, 11 pages, University of Pretoria, South Africa.

(Continued)

*Primary Examiner* — Andrew Goldberg
(74) *Attorney, Agent, or Firm* — Kory D. Christensen; Stoel Rives LLP

(57) ABSTRACT

A system and method for providing a reputation service for use in messaging environments employs a reputation of compiled statistics, representing whether SPAM messages have previously been received from respective a selected set of identifiers for the origin of the message, in a decision making process for newly received messages. In a preferred embodiment, the set of identifiers includes the IP address, a tuple of the domain and IP address and a tuple of the user and IP address and the set of identifiers allows for a relatively fine grained set of reputation metrics to be compiled and used when making a determination of a likelihood as to whether a received message is undesired in accordance with the invention.

23 Claims, 3 Drawing Sheets

(56) References Cited

U.S. PATENT DOCUMENTS

| | | | | |
|---|---|---|---|---|
| 6,052,709 A | * | 4/2000 | Paul | 709/202 |
| 6,061,718 A | * | 5/2000 | Nelson | 709/206 |
| 6,073,165 A | * | 6/2000 | Narasimhan et al. | 709/206 |
| 6,075,863 A | * | 6/2000 | Krishnan et al. | 713/191 |
| 6,092,194 A | * | 7/2000 | Touboul | 726/24 |
| 6,112,227 A | * | 8/2000 | Heiner | 709/203 |
| 6,146,026 A | * | 11/2000 | Ushiku | 709/207 |
| 6,178,331 B1 | * | 1/2001 | Holmes et al. | 455/466 |
| 6,249,805 B1 | * | 6/2001 | Fleming, III | 709/206 |
| 6,249,807 B1 | * | 6/2001 | Shaw et al. | 709/206 |
| 6,263,202 B1 | * | 7/2001 | Kato et al. | 455/418 |
| 6,289,451 B1 | | 9/2001 | Dice | |
| 6,321,267 B1 | * | 11/2001 | Donaldson | 709/229 |
| 6,334,140 B1 | * | 12/2001 | Kawamata | 709/202 |
| 6,434,601 B1 | * | 8/2002 | Rollins | 709/206 |
| 6,438,215 B1 | * | 8/2002 | Skladman et al. | 379/67.1 |
| 6,442,589 B1 | * | 8/2002 | Takahashi et al. | 709/203 |
| 6,453,327 B1 | * | 9/2002 | Nielsen | 715/205 |
| 6,487,586 B2 | * | 11/2002 | Ogilvie et al. | 709/206 |
| 6,510,429 B1 | * | 1/2003 | Todd | 705/36 R |
| 6,574,658 B1 | * | 6/2003 | Gabber et al. | 709/206 |
| 6,650,890 B1 | * | 11/2003 | Irlam et al. | 455/412.1 |
| 6,654,787 B1 | * | 11/2003 | Aronson et al. | 709/206 |
| 6,691,156 B1 | * | 2/2004 | Drummond et al. | 709/206 |
| 6,779,021 B1 | * | 8/2004 | Bates et al. | 709/206 |
| 6,868,498 B1 | * | 3/2005 | Katsikas | 726/14 |
| 7,134,012 B2 | * | 11/2006 | Doyle et al. | 713/151 |
| 7,206,814 B2 | * | 4/2007 | Kirsch | 709/206 |
| 7,257,564 B2 | * | 8/2007 | Loughmiller et al. | 706/16 |
| 7,366,761 B2 | * | 4/2008 | Murray et al. | 709/206 |
| 7,558,266 B2 | * | 7/2009 | Hu | 370/392 |
| 7,668,951 B2 | * | 2/2010 | Lund et al. | 709/223 |
| 7,680,890 B1 | * | 3/2010 | Lin | 709/206 |
| 2002/0120705 A1 | * | 8/2002 | Schiavone et al. | 709/207 |
| 2002/0162025 A1 | * | 10/2002 | Sutton et al. | 713/201 |
| 2004/0039839 A1 | * | 2/2004 | Kalyanaraman et al. | 709/238 |
| 2004/0111476 A1 | * | 6/2004 | Trossen et al. | 709/206 |
| 2005/0050150 A1 | * | 3/2005 | Dinkin | 709/207 |
| 2005/0060535 A1 | * | 3/2005 | Bartas | 713/154 |
| 2005/0204012 A1 | * | 9/2005 | Campbell | 709/206 |
| 2005/0262209 A1 | * | 11/2005 | Yu | 709/206 |
| 2006/0031314 A1 | * | 2/2006 | Brahms et al. | 709/206 |
| 2006/0149821 A1 | * | 7/2006 | Rajan et al. | 709/206 |
| 2006/0168041 A1 | * | 7/2006 | Mishra et al. | 709/206 |
| 2006/0200531 A1 | * | 9/2006 | Tokuda et al. | 709/206 |
| 2006/0251068 A1 | * | 11/2006 | Judge et al. | 370/389 |
| 2007/0073717 A1 | * | 3/2007 | Ramer et al. | 707/10 |
| 2007/0121596 A1 | * | 5/2007 | Kurapati et al. | 370/356 |
| 2007/0185960 A1 | * | 8/2007 | Leiba et al. | 709/206 |
| 2007/0299916 A1 | * | 12/2007 | Bates et al. | 709/206 |

OTHER PUBLICATIONS

Harris, E., "The Next Step in the Spam Control War: Greylisting," Aug. 21, 2003, pp. 1-16, http://projects.puremagic.com/greylisting/whitepaper.html.

PU, C., et al. "Towards the Integration of Diverse Spam Filtering Techniques," 2006 IEEE International Conference on Granular Computing, May 10-12, 2006, pp. 17-20, IEEE.

* cited by examiner

REPUTATION-BASED METHOD AND SYSTEM FOR DETERMINING A LIKELIHOOD THAT A MESSAGE IS UNDESIRED

FIELD OF THE INVENTION

The present invention relates to a system and method for using a reputation, derived for a message originator, to determine a likelihood that a message is undesired. More specifically, the present invention relates to a method and system of producing a reputation metric for message originators, using at least one tuple of message characteristics to identify the message originator, which metric can be used to determine a likelihood that a message is undesired.

BACKGROUND OF THE INVENTION

Undesired email, commonly referred to as SPAM, is generally defined as bulk unsolicited email, typically for commercial purposes. SPAM is a significant problem for email administrators and users. At best, SPAM utilizes resources on email systems, requires email account holder's time to review and delete and is generally frustrating and troublesome. At worst, SPAM can include malicious software and can damage software, systems and/or stored data.

Session Initiation Protocol (SIP) based voice communications are also subject to undesired messages and such undesired messages are also referred to herein as SPAM. While not yet common, voice related SPAM is expected to become a common problem as more users migrate from plain old telephone service (POTS) to SIP-based voice communications. For example, it is possible to send unsolicited commercial messages to every voice mailbox at an organization, utilizing system resources and wasting users' time to review and/or delete the SPAM messages.

Much work has been undertaken in recent years to combat the growing problem of SPAM. One of the methods used to date to reduce undesired email SPAM is the use of Bayesian filtering wherein the content of received emails is examined for specified content to form a statistical decision as to whether the email constitutes SPAM. A message which is deemed to be SPAM can be flagged as such and/or directed to a selected storage folder or deleted from the system. While such filters do recognize many SPAM messages, the originators of the SPAM messages are constantly changing their messages in, often successful, attempts to fool the filters.

Co-pending U.S. patent application Ser. No. 11/357,164 to Fogel, filed Feb. 21, 2006 and entitled, "System and Method For Providing Security For SIP-Based Communications" describes a security appliance and some methods which can be useful to reduce the occurrence of voice SPAM and the contents of this application are incorporated herein by reference.

Another method commonly employed to date is the use of blacklists which identify IP addresses from which messages deemed to be undesired have previously been received and which deem all subsequent messages from those IP addresses as being undesired messages. While blacklists can be effective, they suffer from being very coarse-grained in that they do not distinguish between messages sent from a bone fide user at an IP address and SPAM sent by SPAM originators from that same IP address.

Instead, once the IP address has been identified and blacklisted as being an IP address used to originate SPAM, messages from the bona fide users will no longer be accepted at systems which have blacklisted the IP address. As many Internet Service Providers (ISPs) host multiple email and/or SIP domains at a single IP address, this blacklisting of domains can affect a large number of bona fide users.

More recently, reputation-based techniques have been employed to assist in identifying undesired messages. Such reputation-based techniques comprise database systems which maintain statistics for an IP address and these statistics are compiled from the output of other anti-SPAM systems, such as the above-mentioned Bayesian filter or SIP systems. The statistics indicate the frequency with which SPAM is transmitted from the IP address and can include other information such as whether the sending IP address is a static or dynamic address.

Reputation-based techniques rely upon an analysis of the past activity from an IP address to provide an indication of a likelihood that a new message sent from that IP address is SPAM.

When a messages is received at an email server or SIP proxy, the reputation for the originating IP address is checked in the database and the "reputation" (i.e.—the statistics compiled) for that IP address can be used as one of the inputs to an anti-SPAM process.

Another reputation-based technique for emails is disclosed in the paper, "Sender Reputation in a Large Webmail Service", by Bradley Taylor, presented at CEAS 2006—Third Conference on Email and Anti-Spam, Jul. 27-28, 2006, Mountain View, Calif. This technique creates a reputation for each domain (which are authenticated through other means) from which an email message is received and uses the created reputation as an input to a SPAM detection process.

While reputation-based techniques can be an improvement over Blacklisting, they do suffer from some of the same problems and, in particular, they suffer a lack of granularity which can result in all messages from an IP address or all messages from a domain being identified as SPAM because SPAM has previously been sent from that IP address or domain. As mentioned above, this can result in a large number of bona fide users being adversely affected as a result of the activities of a few originators of SPAM.

It is desired to have a reputation-based system and method for determining a likelihood that a message is undesired which permits finer granularity in tracking reputations.

SUMMARY OF THE INVENTION

It is an object of the present invention to provide a novel reputation-based method and system for determining a likelihood that a message is undesired which obviates or mitigates at least one disadvantage of the prior art.

According to a first aspect of the present invention, there is provided a method of determining a likelihood that a received message is an undesired message, comprising the steps of: (i) receiving a message at a messaging system; (ii) forwarding to a reputation engine a pre-selected set of identifiers relating to the origin of the message, at least one of the identifiers being in the form of a tuple, one half of which represents data which cannot be faked by the originator of the received message; (iii) checking databases at the reputation engine to determine previously determined reputation metrics for the forwarded identifiers and returning any previously determined reputation metrics to the messaging system; (iv) making a first determination at the messaging system of a likelihood as to whether the received message is undesired using a first set of criteria including the returned reputation metrics; and (v) marking the message as being either desired or undesired in accordance with the first determination.

Preferably, the one half of the tuple which cannot be faked is the IP address of the originator of the message. Also preferably, the method further comprises the steps of; (vi) making a second determination at the messaging system as to whether the received message is undesired without using any returned reputation metrics; and (vii) forwarding the second determination to the reputation engine to update the databases and the respective reputation metrics to include the second determination.

According to another aspect of the present invention, there is provided a messaging environment employing a reputation service in determining a likelihood as to whether received messages are undesired, comprising: a plurality of message servers interconnected by a communications network, at least one of the plurality of message servers including an anti-SPAM function to determine a likelihood as to whether received messages are undesired; a plurality of message clients connected to respective ones of the plurality of message servers and operable to receive messages therefrom; and a reputation engine operable to communicate with the at least one message server, the reputation engine maintaining a set of databases associating a reputation metric with each of a preselected set of identifiers relating to the origins of the messages, at least one of the identifiers being in the form of a tuple, one half of which cannot be faked by the originator of the received message, the anti-SPAM function operating to forward the pre-selected set of identifiers to the reputation engine which returns the reputation metrics stored in its databases for any of the identifiers and the anti-SPAM function using the returned reputation metrics to make a first determination of a likelihood as to whether a received message is undesired.

The present invention provides a system and method for providing a reputation service for use in messaging environments employs compiled statistics, representing whether SPAM messages have previously been received from the originator of the message, or related originators, in a decision making process for newly received messages. Message systems receiving a message forward a set of identifiers relating to the origins of the message, such as the originating IP address of the message, a identifier tuple of the domain and IP address from which the message was allegedly received and an identifier tuple of the user and IP address from which the message was allegedly received to a reputation engine. The reputation engine maintains databases for each identifier and each of these databases includes at least one associated reputation metric derived from previously considered received messages and the determinations made by email systems as to a likelihood they are SPAM. The reputation engine returns the associated reputation metrics, if any, for the identifiers to the message system which can then make a determination, with the returned metrics, of a likelihood as to whether the message is SPAM.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
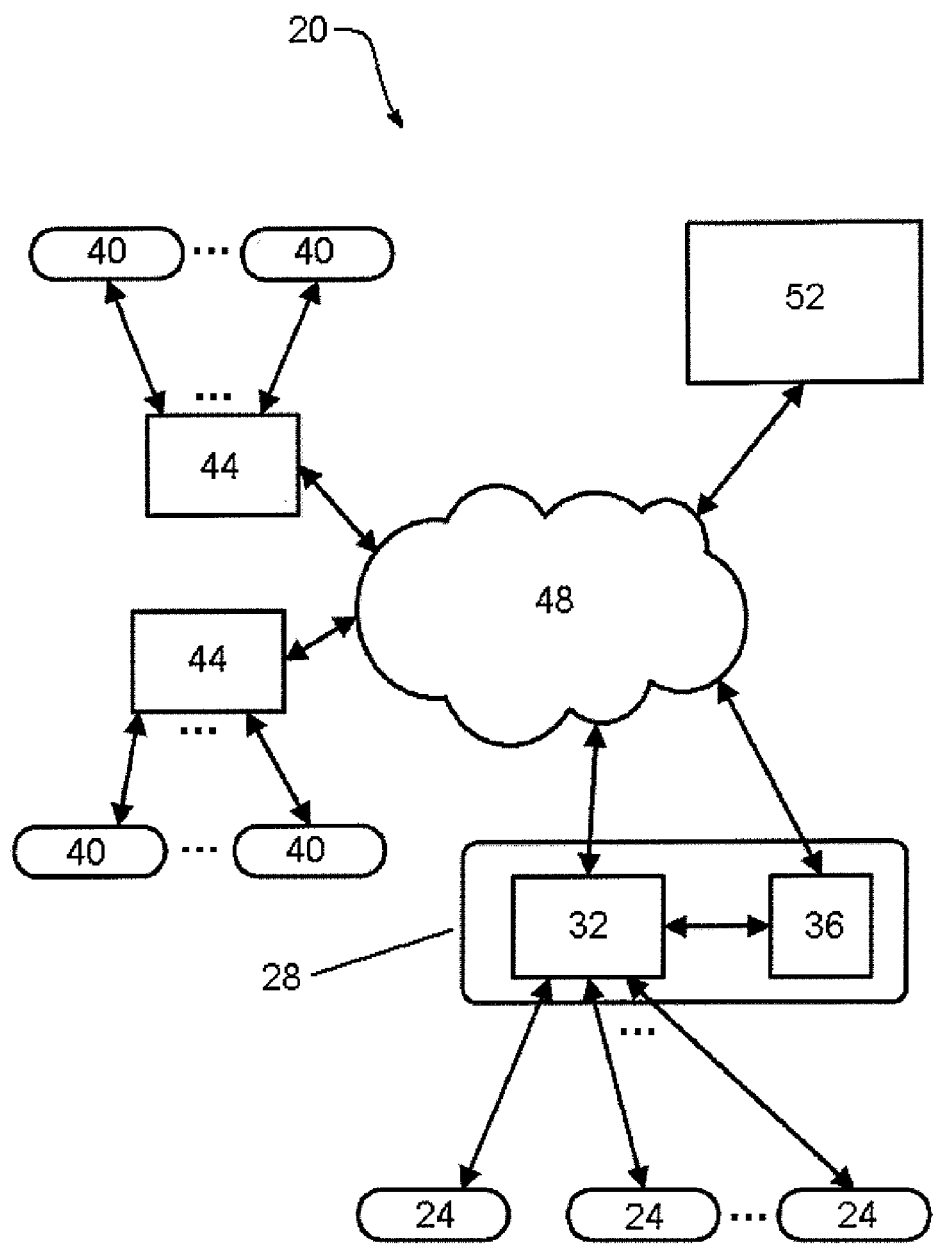
FIG. 1 shows a schematic representation of an email messaging environment employing a reputation service in accordance with the present invention.

An email messaging environment incorporating a reputation service in accordance with the present invention, is indicated generally at 20 in FIG. 1. While the illustrated embodiment is an email messaging embodiment, the present invention is also applicable to other messaging environments, such as SIP-based voice over IP (VoIP), etc.

For example, as is known to those of skill in the art, in addition to the originating IP address, the SIP messages (i.e.—INVITE, etc.) used to setup a voice communication include fields for a user identifier (a name or telephone number, etc.) and a domain. Thus, while the following discussion relates to an email environment in accordance with the present invention, it will be apparent to those of skill in the art that the same general method and system can be employed for SIP-based voice communication as well.

Messaging environment 20 includes at least one email client 24 which connects to an email system 28. Email system 28 includes at least one email server 32, providing incoming and outgoing email services, and an email security appliance 36, such as the MXtreme™ email firewall sold by the assignee of the present invention. Email security appliance 36 provides anti-SPAM services, as described further below, and can provide other security services. Environment 20 also includes a plurality of emails clients 40 which are connected to email servers 44 which provide incoming and outgoing email services.

In the case of a SIP-based messaging environment, security appliance 36 can be a SIP security product, such as the SIPassure™ SIP firewall sold by the assignee of the present invention.

Each of email system 28 and email servers 44 are interconnected by a network 48, such as the Internet, and each device connected to network 48 is identified therein by a unique address. In the illustrated case of the Internet, each device is assigned a unique IP (Internet Protocol) address comprising a set of four values ranging between 0 and 255 (e.g.—75.127.34.65).

As is known to those of skill in the art, each email server 44 and each email system 28 can host one or more domains (i.e.—mail.com, example.co.uk, house.org, etc.) for the email clients 44 which it serves. Thus, two or more domains can send or receive messages at the same unique address for the email system 28 or email server 44 which host them. As used herein, the term "domain" is intended to comprise any suitable indicator for the non-IP address and non-user specific portion of the originator of a message under consideration. As indicated above, domains will typically comprise the portion of an email address or SIP telephone number, etc. to the right of the "@" symbol (e.g. "example.com", however in some countries, a country code is also appended to the domain (i.e.—guys.co.uk), where co.uk is the ccTLD (country code Top Level Domain) and in some cases an additional domain indicator can also be included (i.e.—the "mail" in mail.zap-.co.uk) For consistency purposes, it is preferred that the identifiers for domains used in the present invention comprise the TLD, or ccTLD, and the first identifier to the left of the TLD or ccTLD (i.e.—guys.co.uk or zap.co.uk)

Further, a domain can be hosted at two or more email servers 44 or email systems 28 which are assigned different unique addresses. In fact, this is quite common, especially if a domain is particularly large (i.e. mail.google.com or mail.yahoo.com). Thus, an email sent from such a domain can originate from any one of two or more unique addresses.

A reputation engine 52, in accordance with the present invention, is also connected to network 48, and is assigned an unique address therein. Reputation engine 52 can communicate with authorized email systems 28, via network 48, as described below.

Figure 2:
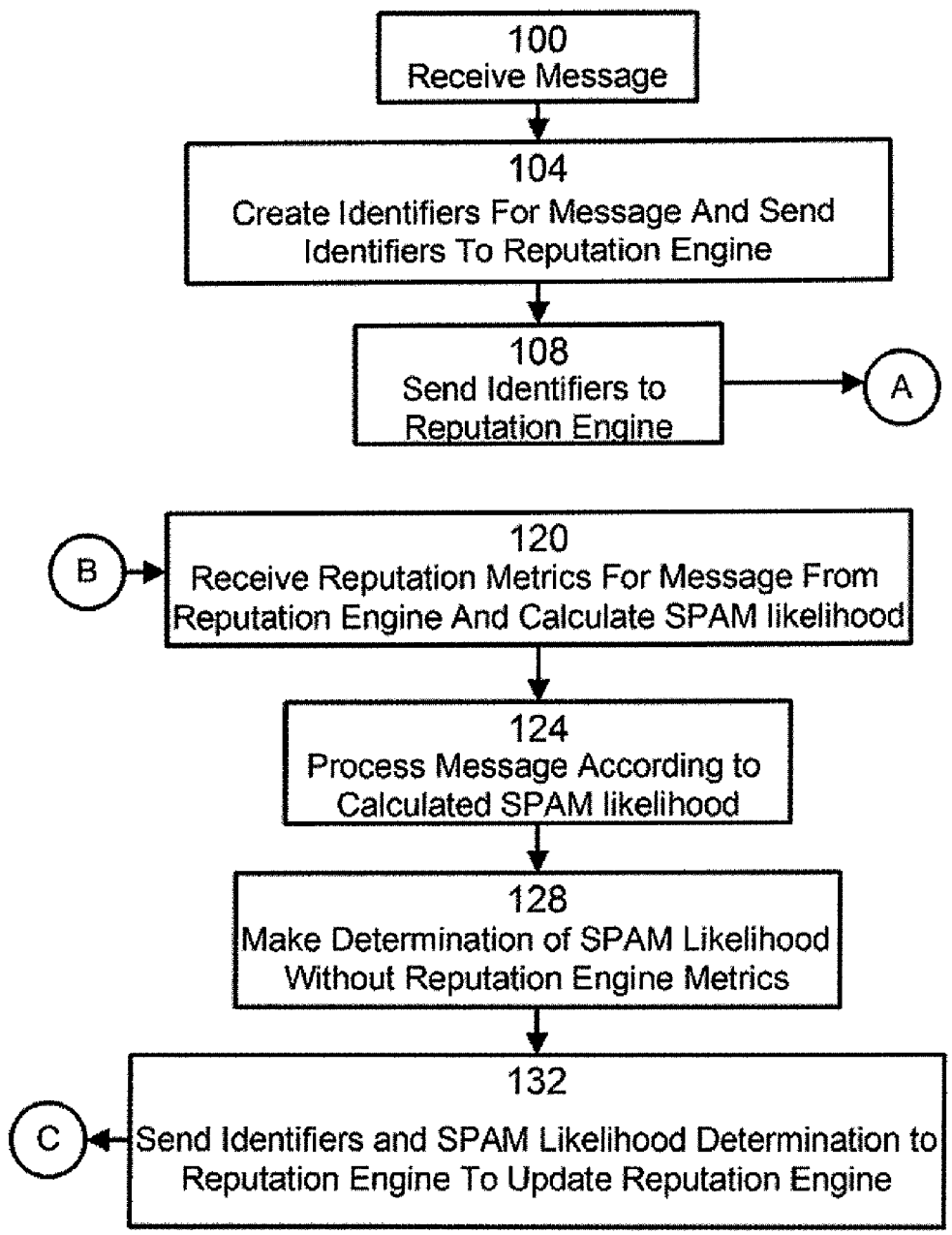
FIG. 2 is a flow chart of a portion of the method of the reputation service of FIG. 1.

FIG. 2 shows a flowchart of a method in accordance with an email environment embodiment of the present invention. The method starts at step 100 wherein an email system receives a message. As used herein, the term message is intended to comprise the entire message, including headers, envelope information (MIME structure, etc.), SIP data fields, receipt timestamp, message text (if any), etc.

At step 104, a set of identifiers is created for the message and these identifiers generally relate to aspects of the origin of the message. In this embodiment of the invention, three unique identifiers are created for the message. Specifically, an identifier is created for the originating IP address from which the message was received, an identifier is created for the tuple of the domain and IP address from which the message was sent (e.g. example.com) and an identifier is created for the tuple of the user and IP address from which the message was sent (e.g. johnsmith@example.com).

As it is difficult for an originator of undesired messages to mask or fake the originating IP address, it is preferred to include the originating IP address as one half of the user and domain tuples. By including the user or domain as the other half of the identifier tuples, reputation metrics can be applied with a finer granularity than in the prior art.

However, it is contemplated that other identifiers, either in addition to or instead of, these three identifiers can be employed if desired, but it is recommended that at least one identifier, in the form of a tuple where at least one half of the tuple cannot easily be faked or masked, is employed. For example, an identifier tuple based upon the originating IP address and other data in the message (MIME structure, etc.) can be employed. As another example which may be more applicable in, but not limited to, SIP-based voice communications, an identifier comprising a tuple of the user or domain and the time the message was received (hour or half hour increment) can be employed, as the time the message was received cannot be spoofed or faked by the originator. This may be useful as an originator of undesired messages may create or initiate such messages outside of normal business hours, or at other particular times.

It is preferred that, for privacy reasons, the identifiers which may have privacy implications, such as the identifier for the domain and IP address tuple and the identifier for the user and IP address tuple, be created via a one-way function which prevents a third party from being able to analyze the identifier to recover the user specific information (i.e. user name and/or domain).

Accordingly, in a present embodiment of the invention, an SHA1 hash function is used to create hash value identifiers for the identifiers for each of the tuples for the originating domain and for the user. Additionally, this can provide an advantage in that the length of the identifiers becomes consistent. However, the present invention is not limited to the use of hash functions, SHA1 or otherwise and any suitable one-way function, as will occur to those of skill in the art, can be employed.

Thus, preferably: the identifier for the IP address is the IP address, or an appropriate representation (ASCII text, hexadecimal, etc.) of the IP address; the identifier for the domain and IP address tuple is a hashed representation of the domain and the IP address; and the identifier for the user and IP address tuple is a hashed representation of the user and the IP address.

It is also contemplated that, in many cases, it will be preferred that the IP address identifier only identify a portion of the IP address, such as the first three octets of the IP address as many large hosts will have email servers which are assigned consecutive IP addresses (i.e. 75.127.34.64, 75.127.34.65, 75.127.34.66, etc.). In such a case, a portion of the IP address, such as the first three octets (i.e. 75.127.34) can constitute enough of an identification of the origin of messages from these hosts. In such a case, the appropriate identifiers discussed above will only include the selected portion of the IP address.

While the use of a reputation associated with an IP address is known from the prior art, the present invention (unlike the prior art) employs one or more finer-grained identifiers relating to the originator/origin of messages in combination with the IP address or other attribute which is not easily spoofed. In particular, in a presently preferred embodiment of the invention, the set of identifiers includes a tuple of the domain and the IP address (i.e. example.com and 75.127.34.65) and a tuple of the user and the IP address (i.e. jsmith@example.com and 75.127.34.65).

Preferably, a suitable reputation metric will be stored for the finest grained tuple, in this example comprising the user and the IP address, as described below. If no such reputation metric is stored for a particular user and IP address tuple, the next most finely grained tuple will be considered, which in this example is the tuple for the domain and IP address. The reputation for the IP address identifier need only be considered if no other, finer-grained, reputation metric is available.

Returning now to FIG. 2, at step 108, the created identifiers are sent to reputation engine 52 via network 48.

Figure 3:
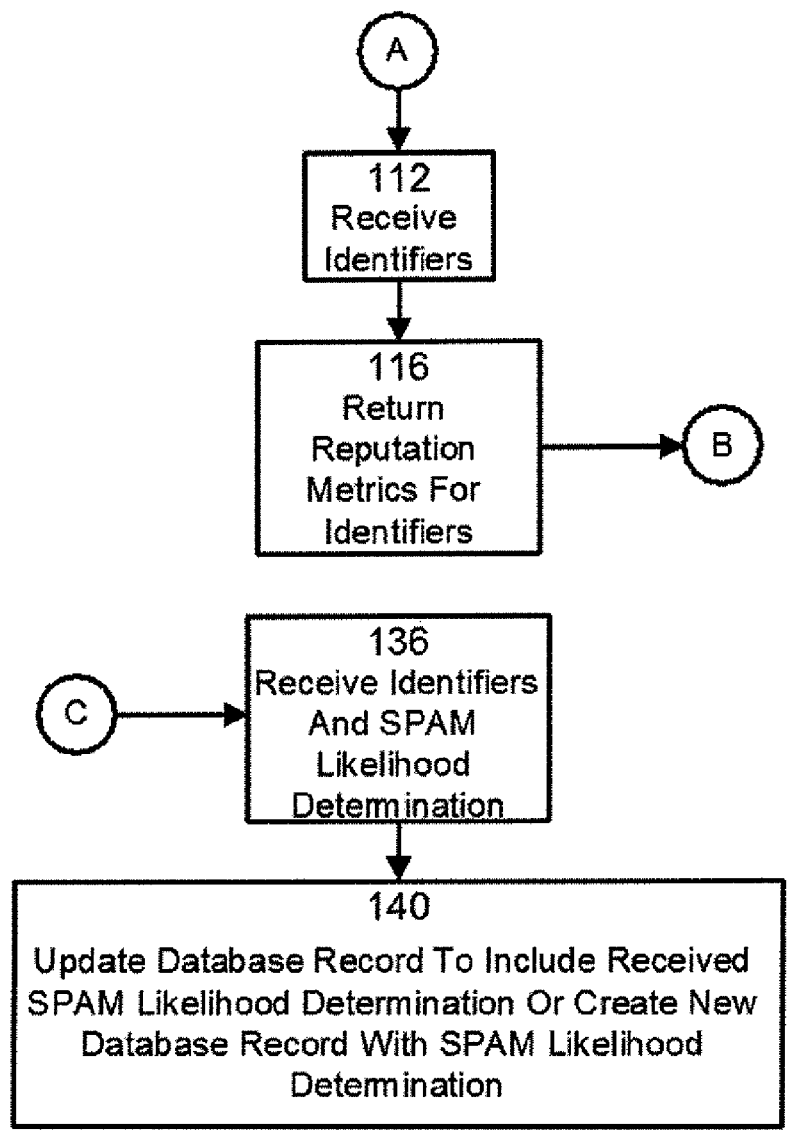
FIG. 3 is a flow chart of another portion of the method of the reputation service of FIG. 1.

Referring now to FIG. 3, at step 112 reputation engine 52 receives the identifiers created for the received message from email security appliance 36. Reputation engine 52 contains a database for each of the categories of identifiers (IP address, domain and IP address tuple, user and IP address tuple, etc.) sent from email security device 36.

Reputation engine 52 searches each database with the respective received identifier. If an entry already exists in the respective database, then reputation engine 52 retrieves the reputation metric stored in the respective database for that identifier.

In a present embodiment, the reputation metric preferably includes at least a pair of counts, one count representing the total number of messages received at any email system 28 in environment 20 cooperating with reputation engine 52 and the second count representing the number of messages received at any email system 28 in environment 20 cooperating with reputation engine 52 which have been identified as being SPAM messages. However, as will be apparent to those of skill in the art, the reputation metric can be any suitable metric or set of metrics such as a percentage or a numerical score produced in accordance with a suitably weighted formula, etc. and can also include counts of previous messages found to contain viruses, counts of previously received malformed messages, counts of recognized directory harvesting attacks, etc.

At step 116, the reputation metrics retrieved from the database for each identifier are returned to email system 28. The actual metrics returned can be a merged metric derived from the data stored in the databases or can be the actual data stored, etc. In a best case, reputation engine 52 will have a reputation metric stored for each identifier (i.e.—IP address; domain and IP address tuple; and user and IP address tuple)

associated with the received message and these reputation metrics can be used by email system 28 as described below.

However, it is contemplated that in many cases reputation engine 52 will, for example, not have a reputation metric stored for the identifier representing a particular user and IP address tuple. In such a case, reputation engine 52 will employ the metrics which it does have, namely metrics for the IP address and the domain and IP address tuple.

Similarly, it is contemplated that in some cases reputation engine 52 will not have a reputation metric for either of the identifiers representing a particular user and IP address tuple or domain and IP address tuple. In such a case, reputation engine 52 will return the reputation metric for the IP address. It is also possible that reputation engine 52 will not have a reputation metric stored for any of the three identifiers, in which case a NULL reputation metric is returned to email system 28. However, in a best case, email system 28 is provided with reputation metrics for the received message for each of the IP address, domain and IP address tuple and user and IP address tuple.

At step 120, email system 28 receives the reputation metrics from reputation engine 52 and security appliance 36 makes a determination as to whether the received message is SPAM. This determination can be made in any suitable manner, as will occur to those of skill in the art, and in a present embodiment of invention is accomplished with a Bayesian Statistical Token Analysis process executing on email security appliance 36.

The actual method of using the reputation metrics when determining a likelihood that the received message is SPAM is not particularly limited and a variety of alternatives will be apparent to those of skill in the art, some of which are trivial. For example, if reputation metrics are returned for each of the IP address, domain and IP address tuple and user and IP address tuple and if those metrics all reflect a high probability that the received message is not SPAM, then there is a high probability that the received message is not SPAM and the determined likelihood that the received message is SPAM will reflect this (i.e.—It is unlikely the message is SPAM).

In a more interesting case, if a message is received and if the reputation metric for IP address indicates a relatively poor reputation (i.e.—large amounts of SPAM have previously been received from this IP address) but the reputation metric for the domain and IP address tuple indicates a relatively good reputation (i.e.—very little SPAM has previously been received from this domain at this IP address), the determined likelihood that the message is SPAM will indicate that that the message is likely not SPAM. This type of analysis can be used to differentiate between multiple domains hosted at the same IP address where one or more domains are used to originate SPAM while the other domains at the same IP address are used by legitimate users.

Similarly, if the reputation metric for the tuple of the user and the IP address is very favorable (i.e.—very little, if any, SPAM has previously been received from his user at this IP address) while the reputation metrics for the IP address and the tuple for the domain and IP address are relatively bad (i.e. high amounts of SPAM messages have previously been received) the determined likelihood that the message is SPAM can indicate that that the message is likely not SPAM. This type of analysis can be used to differentiate between good and bad users hosted at the same domain.

The process of determining a likelihood that a received message is undesired can employ the reputation metrics returned from reputation engine 52 in a wide variety of manners, as will occur to those of skill in the art. As will be apparent, a variety of suitable interpretations can be performed from the reputation metrics. Specifically, knowing that a particular user tuple or domain tuple has not been observed sending undesired messages before but has been sending desired messages can provide a reasonably high level of confidence that a newly received message is desired.

At step 124, the received message is processed by email system 28, according to the determination as to whether the received message is SPAM made at step 120, in accordance with the policies established for anti-SPAM functions at email system 28.

At step 128, the determination as to whether the received message is SPAM is re-calculated without using the reputation metrics returned from reputation engine 52. At step 132, this "reputation free" determination is then sent, via network 48, to reputation engine 52. In a present embodiment of the invention, this likelihood determination that the message is SPAM is a binary (e.g. SPAM or NON-SPAM) determination but it is also contemplated that other determinations, such as values representing a probability that the message is SPAM, can be employed if desired.

It is further contemplated that the reputations metrics of reputation engine 52 can be modified by a variety of other processes, including proactive feedback from the message recipient. Recipient feedback techniques, such as providing a user interface control in email clients 24 with which the user can indicate that a particular received message has incorrectly been identified as undesired, or vice versa, are well known and it is contemplated that such feedback techniques can also be included within the present invention, as will be apparent to those of skill in the art.

At step 136, reputation engine 52 receives the message identifiers and the reputation free determination as to whether the message is SPAM and at step 140, the method completes as reputation engine 52 updates its stored reputation metrics to reflect the SPAM likelihood determination received from email system 28 at step 136.

If at step 116 reputation engine 52 did not have a stored metric for one or more of the received identifiers, suitable records are created in the databases at reputation engine 52 for those identifiers and those records are updated to reflect the reputation free SPAM likelihood determination received from email system 28 at step 136.

This two-iteration method of determining a likelihood that the received message is SPAM (with reputation metrics and without reputation metrics) is presently preferred to reduce the possibility of unstable behavior being induced in reputation engine 52, either intentionally by originators of SPAM or unintentionally. However, it is contemplated that other mechanisms, such as feedback or delay mechanisms can be employed, either in addition to or instead of, the two-iteration method as will occur to those of skill in the art.

In addition to the IP address, domain and IP address tuple and user and IP address tuple reputation metrics discussed above, it is further contemplated that the present invention can also return an indication of a likelihood that a received message is from a spoofed domain. As is well known to those of skill in the art, it is a relatively easy matter for the originator of a SPAM message to represent the message as coming from a domain other than the domain from which it is actually sent and this is commonly referred to as "spoofing". While systems such as "Domain Keys" and "SPF" have been developed to make spoofing more difficult, such systems require active participation/steps be under taken by the domain holder and many domain holders do not take such steps, thereby reducing the effectiveness of these systems.

To detect spoofing of domains, either instead of using "Domain Keys" or SPF or in addition to, reputation engine 52 can also maintain an anti-spoofing database of records relating each domain to each IP address from which messages from that domain have previously been received. In such a case, security appliance 36 will also send a domain identifier to reputation engine 52. Reputation engine 52 will use this domain identifier to locate the appropriate record in the anti-spoofing database and will compare the IP address identifier sent, as discussed above, with the IP address identifiers stored in the record for the identified domain. At step 116 reputation engine 52 can then also return a spoof metric comprising an indication as to whether non-SPAM messages from the domain have previously been received from the identified IP address. This spoof metric can be set when the domain has not previously been associated with the identified IP address and cleared when the domain and IP address have previously been associated.

At step 120, email system 28 can use the spoof metric, in addition to the returned reputation metrics, in recalculating a likelihood that the received message is SPAM and at step 132 reputation engine 52 can also update the anti-spoofing database, if required.

As will now be apparent, the present invention relates to a method and system for providing a reputation service for use in email messaging environments. Statistics, representing whether SPAM messages have previously been received from respective IP addresses, domains and/or users, are incorporated in a decision making process for received messages.

Message systems receiving a message forward an identifier of the originating IP address of the message, a identifier of the domain from which the message was allegedly received and an identifier of the user from which the message was allegedly received to a reputation engine.

The reputation engine maintains databases for each of: the identifier of the originating IP address; the identifier of the domain and IP address tuple; and the identifier of the user and IP address tuple. Each of these databases includes an associated reputation metric derived from previously considered received messages and the determinations made by message systems as to a likelihood they are SPAM.

The reputation engine returns the associated reputation metrics, if any, for the IP address identifier, the domain and IP address tuple identifier and the user and IP address tuple identifier to the email system which can then calculate a determination with the returned metrics as to whether the message is SPAM. The message is handled, according to the calculated determination and the message is then handled according to a defined policy.

Once the message has been handled according to the policy, the calculation as to whether the message is SPAM is re-performed, without consideration of the reputation metrics returned from the reputation engine to obtain a "reputation free" determination, and this reputation free determination is forwarded to the reputation engine to use to update, possibly with other information supplied from the message recipient or other methods, its databases appropriately.

The reputation engine can also return a spoof metric to the message system if the message has originated at an IP address from which the reputation engine has not previously seen messages originate for the identified domain.

The above-described embodiments of the invention are intended to be examples of the present invention and alterations and modifications may be effected thereto, by those of skill in the art, without departing from the scope of the invention which is defined solely by the claims appended hereto.

I claim:

1. A method, comprising the steps of:
receiving a plurality of tuples at a reputation engine operating on a computing device coupled to a network, each of said tuples comprising pre-selected set of identifiers relating to an origin of a message received at a server of a messaging system, wherein each tuple comprises an identifier that is deemed to be trusted by the reputation engine, each of said tuples having a different granularity of identification of the origin of the received message;
accessing, by the reputation engine, two or more reputation metrics in a database, each reputation metric associated with one of the plurality of tuples;
associating each of the plurality of tuples with a different, respective granularity of identification of the origin of the received message, wherein a tuple comprising a combination of a user identifier and an Internet Protocol (IP) address is assigned a higher granularity than a tuple comprising a combination of a domain name and an IP address;
calculating, at the reputation engine, a first value indicative of a likelihood that the received message is undesired using the two or more reputation metrics, wherein calculating the first value comprises overriding a first one of the two or more reputation metrics with a second one of the two or more reputation metrics, in response to the tuple of the second reputation metric being associated with a more finely grained identification of the origin of the received message than the tuple of the first reputation metric.

2. The method according to claim 1, further comprising the steps of:
calculating a second value indicative of a likelihood that the received message is undesired without using the two or more reputation metrics; and
updating the two or more respective reputation metrics using the second value.

3. The method of claim 1, wherein the identifier that is deemed to be trusted by the reputation engine in one of the plurality of tuples is a portion of an Internet Protocol (IP) address of an originator of the received message.

4. The method of claim 3, wherein one of the plurality of tuples comprises an IP address from which the received message originated; the domain at which the message allegedly originated; and the user who allegedly originated the message.

5. The method of claim 1, further comprising accessing a spoof metric indicative of a likelihood that one or more of the identifiers in the plurality of tuples is spoofed, wherein the first value is calculated using the spoof metric.

6. The method of claim 1, wherein the messaging system is an email messaging system.

7. The method of claim 1, wherein the messaging system is a Session Initiation Protocol (SIP)-based voice communication system.

8. The method of claim 1, wherein one or more of the identifiers comprising the plurality of tuples are created using a one-way function.

9. A system, comprising:
a reputation engine operating on a computing device and coupled to a network; and
a message server coupled to the network and configured to provide a plurality of tuples to the reputation engine responsive to receiving a message, each of the tuples comprising a combination of pre-selected identifiers relating to an originator of the received message, wherein each tuple comprises an identifier that is deemed to be trusted by the reputation engine, and wherein each of said tuples is assigned a different granularity of identification of the originator of the received message;

wherein the reputation engine is configured to access two or more reputation metrics in a database, each of the two or more reputation metrics corresponding to one of the plurality of tuples;

wherein the reputation engine is configured to associate each of the two or more reputation metrics with a respective granularity of identification of the originator of the received message, wherein a tuple comprising a combination of a user identifier and an Internet Protocol (IP) address is assigned a higher granularity than a tuple comprising a combination of a domain name and an IP address, and wherein the reputation engine is configured to calculate a first value indicative of a likelihood that the received message is undesired using the two or more reputation metrics, wherein calculating the first value comprises overriding a first one of the two or more reputation metrics with a second one of the two or more reputation metrics, in response to the tuple of the second reputation metric being associated with a more finely grained identification of the origin of the received message than the tuple of the first reputation metric.

10. The system according to claim 9, wherein a second value indicative of a likelihood that the received message is undesired is calculated independently of the two or more reputation metrics, and wherein the reputation engine is configured to update the two or more reputation metrics using the second value.

11. The system according to claim 9, wherein the preselected set of identifiers includes the Internet Protocol (IP) address from which the message was received, the domain from which the message was allegedly sent and the user who allegedly sent the message.

12. The system according to claim 9, wherein at least some of the identifiers are created from message information by a one-way function.

13. The system according to claim 9, wherein the messaging system is an email system.

14. The method of claim 1, wherein a reputation metric associated with a tuple assigned a higher granularity contributes to the first value more than a reputation metric associated with a tuple assigned a lower granularity.

15. The method of claim 1, wherein a reputation metric of a tuple is based upon a total of received messages corresponding to the tuple and a total of received messages corresponding to the tuple that have been identified as undesired.

16. The method of claim 15, wherein the received message is associated with a tuple when the received message comprises the identifiers comprising the tuple.

17. The method of claim 5, wherein one of the plurality of tuples comprises domain name and Internet Protocol (IP) address identifiers, and wherein the spoof metric is based upon whether a message has previously been received from the identified domain name and IP address.

18. The system of claim 9, wherein a reputation metric associated with a tuple assigned a higher granularity contributes to the first value more than a reputation metric associated with a tuple assigned a lower granularity.

19. The system of claim 9, wherein a reputation metric of a tuple is based upon a total of received messages corresponding to the tuple and a total of received messages corresponding to the tuple that have been identified as undesired.

20. The system of claim 19, wherein the received message is associated with a tuple when the received message comprises the identifiers comprising the tuple.

21. The system of claim 9, wherein the reputation engine is configured to calculate a spoof metric indicative of the likelihood that one or more of the identifiers in the plurality of tuples is spoofed, wherein the first value is calculated using the spoof metric.

22. The system of claim 21, wherein one of the plurality of tuples comprises domain name and Internet Protocol (IP) address identifiers, and wherein the spoof metric is based upon whether a message has previously been received from the identified domain name and IP address.

23. A method, comprising:
receiving a message through a network interface of a message server;
accessing a plurality of identifiers indicative of the origin of the received message;
forming a plurality of tuples from the identifiers, at a reputation engine operating on a computing device, each tuple comprising a combination of two or more of the identifiers, wherein one of the two or more identifiers is deemed to be that is deemed to be trusted by the reputation engine;
assigning a different granularity to each of the plurality of tuples, wherein the granularity assigned to a tuple is indicative of a granularity of identification of the origin of the received message provided by the tuple, wherein a tuple comprising a combination of a user identifier and an Internet Protocol (IP) address is assigned a higher granularity than a tuple comprising a combination of a domain name and an IP address;
accessing two or more reputation metrics in a database, each of the two or more reputation metrics being associated with one of the tuples; and
calculating a likelihood that the received message is undesired using the two or more reputation metrics, wherein calculating the first value comprises overriding a first one of the two or more reputation metrics with a second one of the two or more reputation metrics, in response to the tuple of the second reputation metric being associated with a more finely grained identification of the origin of the received message than the tuple of the first reputation metric.

* * * * *